(12) United States Patent
Blaevoet

(10) Patent No.: US 11,767,987 B2
(45) Date of Patent: Sep. 26, 2023

(54) HEAT RECOVERY SYSTEM

(71) Applicant: Jeffrey Paul Blaevoet, Novato, CA (US)

(72) Inventor: Jeffrey Paul Blaevoet, Novato, CA (US)

( * ) Notice: Subject to any disclaimer, the term of this patent is extended or adjusted under 35 U.S.C. 154(b) by 129 days.

(21) Appl. No.: 17/339,507

(22) Filed: Jun. 4, 2021

(65) Prior Publication Data
US 2022/0010973 A1  Jan. 13, 2022

Related U.S. Application Data

(60) Provisional application No. 63/049,382, filed on Jul. 8, 2020.

(51) Int. Cl.
*F24D 11/02* (2006.01)

(52) U.S. Cl.
CPC ...... *F24D 11/0221* (2013.01); *F24D 2200/11* (2013.01); *F24D 2200/12* (2013.01); *F24D 2200/14* (2013.01); *F24D 2200/16* (2013.01)

(58) Field of Classification Search
CPC ............. F24D 11/0221; F24D 2200/11; F24D 2200/14; Y02B 10/20; Y02B 10/40
See application file for complete search history.

(56) References Cited

U.S. PATENT DOCUMENTS

2009/0019876 A1 * 1/2009 Guglietti ............... F24F 5/0046
165/47

* cited by examiner

*Primary Examiner* — Lionel Nouketcha

(57) ABSTRACT

Disclosed herein is a heat recovery system, in accordance with some embodiments. Accordingly, the heat recovery system may include a chiller, primary heat exchangers, primary pumps, secondary heat exchangers, and secondary pumps. Further, the chiller is configured for providing primary fluid and secondary fluid. Further, the primary heat exchangers are configured for exchanging a first amount of heat between the primary fluid and primary mediums creating a heat deficit and/or a heat excess in the primary mediums. Further, the primary pumps are configured for circulating the primary fluid between the chiller and the primary heat exchangers. Further, the secondary heat exchangers are configured for exchanging a second amount of heat between the secondary fluid and secondary mediums. Further, the secondary pumps are configured for circulating the secondary fluid between the chiller and the secondary heat exchangers.

18 Claims, 6 Drawing Sheets

HEAT RECOVERY SYSTEM

The current application claims a priority to the U.S. Provisional Patent application Ser. No. 63/049,382 filed on Jul. 8, 2021.

FIELD OF THE INVENTION

Generally, the present disclosure relates to the field of heat exchange. More specifically, the present disclosure relates to a heat recovery system.

BACKGROUND OF THE INVENTION

Geothermal systems have typically used condenser water, with or without antifreeze, varying from 90F to 30F as the fluid circulated through the ground heat exchanger, and then a water source heat pump (WSHP) heats or cools water (HHW, DHW, or CHW) or air from that. Solar thermal systems usually circulate water, with or without antifreeze, through the solar panels to generate heat for domestic hot water (DHW) or pool water heating. Wastewater heat recovery uses macerated wastewater directly in a heat exchanger, or indirectly with a pipe wrapped around the wastewater pipe, which is then used as a heat source for a heat pump to generate DHW.

Existing heat recovery systems require boilers and cooling towers. Further, the boilers emit carbon emissions and other emissions by burning fossil fuels in the boilers. Also, rejecting heat using water in the cooling towers wastes potable water supply.

Therefore, there is a need for an improved heat recovery system that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a heat recovery system, in accordance with some embodiments. Accordingly, the heat recovery system may include a chiller, a plurality of primary heat exchangers, a plurality of primary pumps, a plurality of secondary heat exchangers, and a plurality of secondary pumps. Further, the chiller may be configured for providing primary fluid associated with a primary temperature from a primary port of the chiller and secondary fluid associated with a secondary temperature from a secondary port of the chiller. Further, the plurality of primary heat exchangers may be fluidly coupled with the primary port of the chiller. Further, the plurality of primary heat exchangers may be configured for exchanging a first amount of heat between the primary fluid and a plurality of primary mediums creating at least one of a heat deficit and a heat excess in the plurality of primary mediums. Further, the plurality of primary mediums may include at least one first primary medium and at least one second primary medium. Further, the at least one first primary medium allows recovering of at least one of the heat deficit and the heat excess of the first amount of the heat from the at least one first primary medium. Further, the at least one second primary medium does not allow recovering of at least one of the heat deficit and the heat excess of the first amount of the heat from the at least one second primary medium. Further, the plurality of primary pumps may be fluidly coupled with the primary port of the chiller and the plurality of primary heat exchangers. Further, the plurality of primary pumps may be configured for circulating the primary fluid between the chiller and the plurality of primary heat exchangers. Further, the exchanging of the first amount of the heat may be based on the circulating of the primary fluid. Further, the plurality of secondary heat exchangers may be fluidly coupled with the secondary port of the chiller. Further, the plurality of secondary heat exchangers may be configured for exchanging a second amount of heat between the secondary fluid and a plurality of secondary mediums. Further, the plurality of secondary pumps may be fluidly coupled with the secondary port of the chiller and the plurality of secondary heat exchangers. Further, the plurality of secondary pumps may be configured for circulating the secondary fluid between the chiller and the plurality of secondary heat exchangers. Further, the exchanging of the second amount of the heat may be based on the circulating of the secondary fluid.

Further disclosed herein is a heat recovery system, in accordance with some embodiments. Accordingly, the heat recovery system may include a chiller, a plurality of primary heat exchangers, a plurality of primary pumps, a plurality of secondary heat exchangers, a plurality of secondary pumps, and a supply air handling unit. Further, the chiller may be configured for providing primary fluid associated with a primary temperature from a primary port of the chiller and secondary fluid associated with a secondary temperature from a secondary port of the chiller. Further, the plurality of primary heat exchangers may be fluidly coupled with the primary port of the chiller. Further, the plurality of primary heat exchangers may be configured for exchanging a first amount of heat between the primary fluid and a plurality of primary mediums creating at least one of a heat deficit and a heat excess in the plurality of primary mediums. Further, the plurality of primary mediums may include at least one first primary medium and at least one second primary medium. Further, the at least one first primary medium allows recovering of at least one of the heat deficit and the heat excess of the first amount of the heat from the at least one first primary medium. Further, the at least one second primary medium does not allow recovering of at least one of the heat deficit and the heat excess of the first amount of the heat from the at least one second primary medium. Further, the plurality of primary pumps may be fluidly coupled with the primary port of the chiller and the plurality of primary heat exchangers. Further, the plurality of primary pumps may be configured for circulating the primary fluid between the chiller and the plurality of primary heat exchangers. Further, the exchanging of the first amount of the heat may be based on the circulating of the primary fluid. Further, the plurality of secondary heat exchangers may be fluidly coupled with the secondary port of the chiller. Further, the plurality of secondary heat exchangers may be configured for exchanging a second amount of heat between the secondary fluid and a plurality of secondary mediums. Further, the plurality of secondary pumps may be fluidly coupled with the secondary port of the chiller and the plurality of secondary heat exchangers. Further, the plurality of secondary pumps may be configured for circulating the secondary fluid between the chiller and the plurality of secondary heat exchangers. Further, the exchanging of the second amount of the heat may be based on the circulating of the secondary fluid. Further, the supply air handling unit may be thermally coupled with a secondary heat exchanger of the plurality of secondary heat exchangers. Further, the supply air handling unit may be configured for supplying an output supply air associated with an output supply temperature from a supply outlet of the supply air handling unit based on receiving an input supply air associated with an input supply temperature through a supply inlet of the supply air handling unit. Further, the secondary heat exchanger may be configured for exchanging the second amount of the heat between the secondary fluid and the input supply air associated with the input supply temperature for creating the output supply air associated with the output supply temperature based on the receiving. Further, the supplying of the output supply air may be based on the creating of the output supply air.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
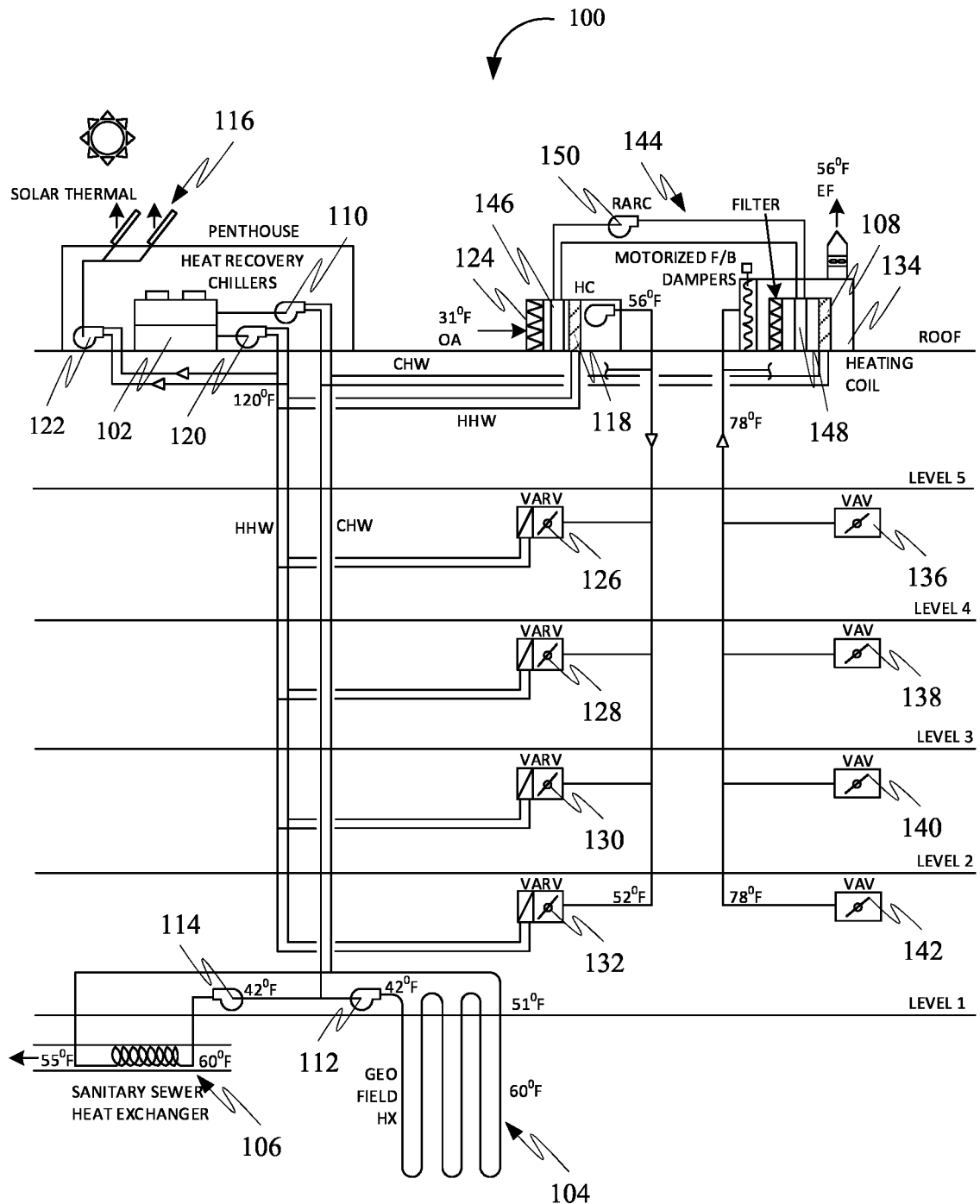
FIG. 1 is a schematic view of a heat recovery system, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a heat recovery system, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes a heat recovery system. Further, the heat recovery system may include a heat recovery central plant that does not require boilers or cooling towers. Further, the heat recovery central plant is a carbon-free, geothermal, wastewater, and solar heat recovery central plant and air handling system design with no boilers or cooling towers. Further, the heat recovery central plant circulates 120F heating hot water (HHW) or 42F chilled water (CHW) in a geothermal heat exchanger of the heat recovery central plant to reject heat to the ground or pull heat from the ground. Further, the heat recovery central plant circulates 120F heating hot water (HHW) or 42F chilled water (CHW) in a solar thermal panel of the heat recovery central plant to reject heat to the night sky radiantly or absorb heat radiation from the sun. Further, the heat recovery central plant circulates 120F heating hot water (MW) or 42F chilled water (CHW) in a wastewater heat exchanger of the heat recovery central plant to reject heat to the wastewater or pull heat from the wastewater.

Further, heat recovery central plant may include a separate supply and exhaust air handling units are used to supply heat or cooling to the building and then, with a hydronic coil in the exhaust air stream, reject heat to the exhaust air with sprayed or unsprayed MW, or pull heat from the exhaust air with CHW in the coil.

Further, the heat recovery central plant may include a run-around coil, which is used as an "economizer" for heat recovery from the exhaust air, reducing heat recovery chiller compressor energy use. Face and bypass dampers on the exhaust air-handling unit enable reduced fan energy consumption when heat recovery or rejection from the exhaust air is not required, but ventilation is still needed.

Further, the heat recovery central plant rejects or extracts heat in priority order as follows: geothermal, solar, wastewater, air. The reason for this is that heat can be stored in the ground for recovery later, whereas once the heat is sent to the air or wastewater, it cannot be recovered easily. Solar energy and night sky radiant cooling is free, to be exploited whenever available. Rejecting heat to wastewater up to 86F can assist in the effluent's biological treatment process.

Not burning natural gas in boilers reduces carbon and other emissions and reduces leakage of methane from the gas distribution network. Not rejecting heat using water in evaporative cooling towers and blowdown preserves our precious potable water supply.

Further, the heat recovery central plant may be applied to or adapted for almost any project in any location. This design will have a huge beneficial impact around the world, by using renewable and recovered heat energy, reducing carbon emissions, and preserving our extremely rare planet and occupants.

Further, the heat recovery central plant may operate in two extreme modes (heating load dominated, and cooling load dominated). Intermediate conditions of the heat recovery central describe the operation of the heat recovery central plant.

Further, the present disclosure relates generally to renewable energy. More specifically, the present disclosure describes a carbon-free, geothermal, wastewater, and solar heat recovery central HVAC plant without boilers or cooling towers.

Further, the heat recovery central plant may be associated with BAS sequences of operations. Further, the BAS sequence of operations may be dived into three parts 1. General, 2. Products, and 3. Execution. Further, 1. General may include:

1.1 General

A. Setpoints shall be remotely adjustable via the OWS. A "(1)" in the sequences below indicates a setpoint that shall be user adjustable, and accessible via the graphical interface.

B. Controllers and or control functions/Control "loops" are to incorporate PID algorithms. Determine and apply the PID values to each loop to ensure proper control and system/loop stability.

C. All System data and variables are to be "readable" and have the capability to be used by all features and applications of the system.

D. Do not implement any changes to these sequences, however minor, without submitting the changes for approval in narrative form. Diagrammatic and programming language or code submissions will not be reviewed or approved.

E. The duct static pressure setpoints and differential pressure setpoints on water systems shall be established by Section 230593 during test & balance and shall be the lowest setting possible to maintain design air and water flow rates.

F. Provide customized control strategies and control sequences and define appropriate control loop algorithms and choose the optimum loop parameters for loop control. All control loops shall be tuned to stabilize within plus or minus 1 percent of setpoint within 5 minutes of setpoint change or startup.

G. Safety devices shall be hardwire interlocked with "hand" and "automatic" positions in series with motor controller holding circuit.

H. Start-up sequences and automatic control sequences as described shall operate in both automatic and manual modes.

I. Smoke control, fire, and life safety sequences shall override other automatic control sequences including hardwired safety devices.

J. Reset schedules and setpoints shown in sequences are for initial programming and start up. During system commissioning the reset schedules and setpoints shall be fine-tuned to obtain desired comfort, energy, and life safety system results.

K. The output of the reset schedules should be limited between maximum and minimum values. The intent of the reset schedules indicated is that the range of the output is limited between the minimum and maximum values indicated in the reset schedules.

L. All functions which use analog points to switch equipment on and off (e.g. fans, pumps) must be programmed with dead bands, and if necessary, time delays to prevent short cycling of equipment.

M. Starting of fans and pumps shall have built in time delays where a damper or valve is required to open or close prior to fan or pump pressure build up.

N. Reporting of frequency of variable frequency drives shall be the actual frequency of the unit based on a feed back loop from the VFD. Reporting of VFD frequency as a percentage of maximum (whether 60 Hz or a field adjusted revised maximum setting) is not acceptable.

1.2 Mode of Operation Definition

A. Occupied Mode: The system shall operate in occupied mode whenever the occupancy schedule indicates an occupied time period or when any zone control space temperature sensor override device is in the override position.

B. Setback Mode: The system shall operate in setback mode when an AHU is in unoccupied mode and a space temperature sensor indicates temperature below the unoccupied heating setpoint.

C. Warm Up Mode: The system shall operate in warm up mode when the system is running prior to scheduled occupancy time as determined by the optimum start program and the space temperature is lower than the occupied heating setpoint.

D. Cool Down Mode: The system shall operate in cool down mode when the system is running prior to scheduled occupancy time as determined by the optimum start program and the space temperature is higher than the occupied cooling setpoint.

E. Unoccupied Mode: The system shall not operate whenever the operating schedule indicates an unoccupied time period unless mode is overridden by operator input.

F. Fire Mode: The system shall run in this mode based on input from the Fire Alarm System. This mode shall have priority over all other control modes.

Further, 2. Products:

2.1 not Used.

Further, 3. Execution:

3.1 Primary/Secondary Heat Recovery Chilled Water System (Cooling Loads Dominant)

A. Chiller Operation

1. When loads are cooling dominant the CHW supply temperature will be controlled to setpoint and the HHW supply temperature will float.

2. The chiller(s) shall be enabled to run whenever:

a. The chiller plant is scheduled on.

b. AND a definable number of chilled water coils, equal to 90% (adj.) flow, need cooling.

c. OR a definable number of heating hot water coils or DHW, equal to 90% (adj.) flow, need heating.

3. The chiller(s) shall be disabled whenever:

a. All chilled water coil valves are closed.

b. AND all the heating water coil and DHW preheat valves are closed.

c. OR at failure of condenser or evaporator water flow.

d. OR the chiller plant is scheduled to be OFF.

4. To prevent short cycling, the chiller shall run for a minimum of 15 minutes and be off a minimum of 15 minutes unless shutdown on safeties or outside air conditions. The chiller shall run subject to its own internal safeties and controls. During periods of single chiller operation where the chiller cycles to maintain chilled water setpoint temperature, control operation of the condenser water pump based on an on/off signal from the chiller via wiring interlock with each chiller.

5. If the lead chiller is inoperable or fails to start, the lead chiller shall be disabled, and the chiller's isolation valves shall be closed. The lag chiller shall be started as described under "Add Chiller Control" below.

6. "Add Chiller" Control:

a. Chiller's evaporator and condenser isolation valves are commanded open and the 100% closed limit switch is lost. Valves shall be slow acting type.

b. 60 seconds after status of primary and secondary chilled water, and condenser water pumps are proven by a flow switch installed downstream of each pump and the 100% open limit switch at the evaporator isolation valve is received, the lag chiller shall be started.

c. The lead chiller shall run for at least 15 minutes before the lag chiller can be started.

d. Start the lag chiller when either of the following conditions is met:

(1) Lead chiller's discharge temperature is more than 1 degree above setpoint for 10 minutes.

(2) OR secondary chilled water supply temperature is more than 1 degree above setpoint for 10 minutes.

(3) OR lead chiller's % KW is more than 95% for 10 minutes when the condenser water supply temperature is within 5 degrees of design temperature.

(4) OR lead chiller's % KW is more than 90% for 10 minutes when the condenser water (HHW) supply temperature is 5 degrees or more, below the design condenser water (HHW) supply temperature.

(5) AND the lag chiller's dedicated chilled water and condenser water pumps have been turned on for 1 minute.

e. After a chiller has been commanded on, no further staging shall occur for 10 minutes.

7. "Subtract Chiller" Control—The criteria for disabling chillers shall be as follows:

a. % KW for either chiller is less than 45% for 10 minutes, the lag chiller shall be commanded off.

b. After a chiller has been commanded off, no further staging shall occur for 10 minutes.

c. Upon a chiller off-command and after a 1 minute time delay the lag chiller's dedicated chilled and condenser water pumps shall be commanded off.

d. During periods of single chiller operation where the chiller cycles to maintain chilled water setpoint temperature and % KW is at, or less than, 5% above the chiller's minimum operating point, reduce the chilled water supply temperature setpoint to 40 deg. F. with an 8 degree deadband. Monitor chiller's requirement for condenser water pump operation, via wiring interlock with each chiller, and turn on the condenser water pump when required by the chiller.

8. Chiller Rotation: The operator shall be able to designate normal, base, peak, and swing chillers to increase system efficiency and equalize chiller run time. Manual or automatic rotation of the chiller sequence shall be allowed. Rotation time interval shall be operator adjustable.

B. Secondary Chilled Water Pump Operation:

1. The pumps shall be enabled anytime a cooling coil is enabled AND a primary chilled water pump is on, as proved by a flow switch installed downstream of each primary pump.

2. The pump shall have:

a. A 10 second delay on start to allow opening of isolation valves.

b. A 45 second delay on stop.

c. Pump VFD shall not operate below 20% of maximum frequency.

d. Provide alarms as follows:

(1) Failure: Commanded on, but the status is off.

(2) Running in hand: Commanded off, but the status is on.

(3) Runtime exceeded: Status runtime exceeds a user definable limit.

3. In the event that the lead chilled water pump fails, as sensed by the pump's current relay or by the alarm signal from the pump's VFD or by the flow switch installed downstream of each pump, the lead pump shall be stopped, and an alarm generated at the OWS. Simultaneously, the lag pump shall be started.

4. The lead/lag assignment shall be automatically changed on a bi-monthly basis.

C. Secondary Chilled Water Pump Control

1. The speed of the secondary chilled water pumps shall be controlled to maintain the differential pressure setpoint as sensed by the differential pressure sensor installed upstream of the last air handling unit and wired directly to the field control panel controlling the chilled water pumps and the chillers.

2. Start the lag pump on decreasing differential pressure or when the VFD speed on the lead pump is greater than 90%, and run in unison with the lead pump to maintain chilled water differential pressure setpoint.

3. The setpoint for the differential pressure shall be established during balancing.

4. Monitor the position of chilled water motorized control valves and gradually reduce the differential pressure setpoint when there are no valves that are open more than 90%.

D. Chilled Water Supply (CHWS) Temperature—Setpoint Reset:

1. The chilled water supply temperature setpoint shall reset using a trim and respond algorithm based on cooling requirements.

2. As any of the building's chilled water valves open beyond 90% the setpoint shall reset to a lower value. Once the chilled water coils are satisfied (valves closing) then the setpoint shall gradually rise over time, to a maximum value of 12 deg F. above design chilled water supply temperature, to reduce cooling energy use. This upwards temperature reset will not be implemented when the OR chilled water fan-coils are in use.

3. Chillers shall be controlled by the chiller control packages with the chilled water supply temperature reset by the BMS. Upon startup of any chiller, the chilled water supply temperature setpoint shall be ramped from its maximum value to the chilled water supply temperature setpoint at a to-be-determined rate in degrees F. per minute. If a second chiller is started the operating chiller shall have its setpoint reset to maximum and then ramped down with the newly started chiller. The minimum chilled water temperature shall be the design chilled water supply temperature (1) unless reset as noted below.

4. When the chiller % KW is at 25% (1) or less:

a. Lower the chilled water supply temperature setpoint to 40 deg F. (1).

b. Disable the chiller when the supply water temperature actually reaches 40 deg F. (1).

c. Enable the chiller when the chilled water supply temperature reached 5 deg F. (1) above the set point.

d. There shall be no chiller lockout temperature when MW is required.

E. Chiller System Status Display: The chiller plant control software shall provide operating status for the system. The display shall include:

1. System mode of the chiller plant
2. Chiller enable/disable status
3. System supply water setpoint
4. System supply and return water temperature
5. System Chilled water pump status
6. System Chilled water flow
7. Bypass pipe flow rate
8. Current chiller plant control operation
9. Add information
10. Subtract information
11. System failure information
12. Chiller failure information
13. Rotation information
14. Override capabilities to force an add control, subtract control, or change of sequence.
15. Remove a chiller or pump from a sequence temporarily for service purposes.

F. Event Processing—All chiller plant control and status events shall be recorded, at the operator's selection, in the building management system event log to facilitate troubleshooting.

G. System Security—The chiller plant control system shall allow program security to be designated for each operator with a choice of the following functions:

1. View chiller plant status
2. Change chiller plant status
3. View chiller plant setup
4. Change chiller plant setup H. Alarm Indications—The chiller plant control status screens shall display chiller plant and individual chiller alarm messages.

I. CHW/HHW system heat balance temperature control: Whenever the heating load exceeds the cooling load in the building or the cooling load exceeds the building load in the building, the excess heat is rejected or extracted through the exhaust air stream coil in AHU 1A/1B-5A/5B (see AHU section below).

3.2 Primary-Only Variable Flow Heating Hot Water System (Heating Loads Dominant)

A. Chiller Operation

1. When loads are heating dominant the HHW supply temperature will be controlled to setpoint and the CHW supply temperature will float. (Note: This should not be the operating mode when the OR fan-coils are in use.)

2. The chiller(s) shall be enabled to run whenever:
 a. The chiller plant is scheduled on
 b. AND a defined number of heating hot water coils or DHW need heating.
 c. OR the outside air temperature is below 60 deg F. and any zone is in the occupied or warm up mode and is calling for heating (heating control valve is modulating).
 d. AND chiller's evaporator and condenser isolation valves are commanded open and the 100% closed limit switch "closed" status is lost. Valves shall be slow acting type.
 e. AND 60 seconds after status of primary chilled water and condenser water pumps are proven by a flow switch installed downstream of each pump and the 100% open limit switch at the chiller isolation valves is received.

3. The chiller(s) shall be disabled whenever:
 a. On failure of condenser water or evaporator flow.
 b. OR all the heating water coil and DHW preheat valves are closed.
 c. OR the chiller plant is scheduled to be OFF.

4. To prevent short cycling, the chiller shall run for a minimum of 15 minutes and be off a minimum of 15 minutes unless shutdown on safeties or outside air conditions. The chiller shall run subject to its own internal safeties and controls. During periods of single chiller operation where the chiller cycles to maintain heating hot water setpoint temperature, control operation of the condenser water pump based on an on/off signal from the chiller via wiring interlock with each chiller.

5. "Add Chiller" Control—The criteria for adding chillers shall be as follows:
 a. The lead chiller shall run for at least 15 minutes before the lag chiller can be started.
 b. Start the lag chiller when either of the following conditions is met:
  (1) Lead chiller's discharge temperature is more than 1 degree below setpoint for 10 minutes.
  (2) OR lead chiller's % KW is more than 95% for 10 minutes when the condenser water (HHW) supply temperature is within 5 degrees of design temperature.
  (3) OR lead chiller's % KW is more than 90% for 10 minutes when the condenser water (HHW) supply temperature is 5 degrees or more below the design condenser water (HHW) supply temperature.
 c. For starting the lag chiller conform to the following sequence of events:
  (1) Open the condenser isolation valve on the lag chiller and start the lag condenser water pump.
  (2) Reduce the lead chiller's maximum power input to a pre-determined value (determined during testing and balancing of the system).
  (3) During a 60 second time period gradually open the lag chiller's evaporator isolation valve to achieve not less than the minimum flow required by the chiller as measured by the flow meter across the lag chiller. Increase the speed of the pump if required to maintain minimum chiller flow.
  (4) Start the lag chiller.
  (5) Remove lead chiller's maximum power input limitation.
 d. After a chiller has been commanded on, no further staging shall occur for 10 minutes.

6. "Subtract Chiller" Control—The criteria for disabling chillers shall be as follows:
 a. % KW for either chiller is less than 45% for 10 minutes, the lag chiller shall be commanded off.
 b. After a chiller has been commanded off, no further staging shall occur for 10 minutes.
 c. Upon a chiller off-command, and after a 1 minute time delay the lag chiller's evaporator and condenser water isolation valves shall be commanded closed and the lag condenser water pump shall be commanded off.
 d. During periods of single chiller operation where the chiller cycles to maintain heating hot water setpoint temperature and % KW is at, or less than, 5% above the chiller's minimum operating point, reduce the heating hot water supply temperature setpoint by 10 deg F. with an 8 degree deadband. Monitor chiller's requirement for chilled water pump operation, via wiring interlock with each chiller, and turn on the chilled water pump when required by the chiller.

7. Chiller Rotation—The operator shall be able to designate normal, base, peak, and swing chillers to increase system efficiency and equalize chiller run time. Manual or automatic rotation of the chiller sequence shall be allowed. Rotation time interval shall be operator adjustable.

B. Heating Hot Water (Condenser Water) Pump Operation:

1. The pump shall run anytime the chiller is called to run.
2. The pump shall have:
 a. A 10 second delay on start.
 b. A 45 second delay on stop.
 c. Pump VFD shall not operate below 20% of maximum frequency.
 d. Provide alarms as follows:
  (1) Failure: Commanded on, but the status is off.
  (2) Running in hand: Commanded off, but the status is on.
  (3) Runtime exceeded: Status runtime exceeds a user definable limit.
3. In the event that the lead heating hot water pump fails, as sensed by the pump's current relay or by the alarm signal from the pump's VFD or by the flow switch installed downstream of each pump, the lead pump shall be stopped, its isolation valve closed, and an alarm generated at the OWS. Simultaneously, the redundant chiller's pump isolation valve shall be opened and the redundant pump started.
4. The redundant chiller/pump assignment shall be automatically changed on a bi-monthly basis.

C. Heating Hot Water Pump Control

1. The speed of the heating hot water pumps shall be controlled to maintain the differential pressure setpoint, as sensed by the differential pressure sensor, installed upstream of the last reheat coil, and wired directly to the field control panel controlling the heating hot water pumps and the chillers, but not less than the speed required to maintain the differential pressure setpoint across the operating chiller to ensure minimum flow as required by the chiller manufacturer.

2. Start the lag pump when the differential pressure is below setpoint and the lead pump's speed is greater than 90% for 5 minutes, and run both pumps in unison to maintain heating hot water differential pressure setpoint. The lag pump shall be disabled when both pumps are operating at 20% VFD speed.

3. The setpoint for the differential pressure shall be established during balancing. 4. Monitor the position of heating hot water motorized control valves and gradually reduce the differential pressure setpoint when there are no valves that are open more than 90%.

D. Heating Hot Water Supply (MWS) Temperature—Setpoint Reset:

1. The heating hot water supply temperature setpoint shall reset using a trim and respond algorithm based on heating requirements.

2. As the building's heating hot water valves open beyond 90% the setpoint shall reset to a higher value, but not more than the design heating water temperature (135F). Once the heating hot water coils are satisfied (valves closing) then the setpoint shall gradually lower over time to reduce heating energy use to a maximum value of 35 deg F. below design heating hot water supply temperature (ie 100F).

3. Chillers shall be controlled by the chiller control packages with the heating hot water supply temperature reset by the BMS. Upon startup of any chiller, the heating hot water supply temperature setpoint shall be ramped from its minimum value to the heating hot water supply temperature setpoint at a to-be-determined rate in degrees F. per minute. If a second chiller is started the operating chiller shall have its setpoint reset to minimum and then ramped up with the newly started chiller. The maximum heating hot water temperature shall be the design heating hot water supply temperature ie 135F (1).

E. Chiller System Status Display: The chiller plant control software shall provide operating status for the system. The display shall include:

1. System mode of the chiller plant.
2. Chiller enable/disable status.
3. System supply water setpoint.
4. System supply and return water temperatures.
5. System heating hot water pump status.
6. System heating hot water flow
7. Current chiller plant control operation.
8. Add information.
9. Subtract information.
10. System failure information.
11. Chiller failure information.
12. Rotation information.
13. Override capabilities to force an add control, subtract control, or change of sequence.
14. Remove a chiller or pump from a sequence temporarily for service purposes.

F. Event Processing—All chiller plant control and status events shall be recorded, at the operator's selection, in the BMS event log to facilitate troubleshooting.

G. System Security: The chiller plant control system shall allow program security to be designated for each operator with a choice of the following functions:

1. View chiller plant status
2. Change chiller plant status
3. View chiller plant setup
4. Change chiller plant setup H. Alarm Indications—The chiller plant control status screens shall display chiller plant and individual chiller alarm messages.

I. Failure Recovery—Upon sensing a chiller failure the chiller plant control software shall lockout that chiller and pump and immediately initiate the start of the next chiller in the rotation sequence. A rapid powerfail recovery capability shall return the chiller plant to its last state (before the building controller lost power) as quickly as possible after the building controller powers up. The chiller plant control program will retry chillers (an operator entered number of tries) if all chillers have been marked as failed.

J. CHW/HHW system heat balance temperature control: Whenever the heating load exceeds the cooling load in the building or the cooling load exceeds the building load in the building, the excess heat is rejected or extracted through the exhaust air stream coil in AHU 1A/1B-5A/5B (see AHU section below).

3.3 Water-to-Water Heat Pump for Dhw Heating

A. Heat Pump Operation

1. The DHW heat pump operates whenever the main (100-135F) HHW and flat plate solar thermal pre-heat systems are insufficient to raise the DHW temperature to above 150 deg F. (1).

2. The heat pump shall be enabled to run whenever:
   a. The main heat recovery chiller plant is scheduled on.
   b. AND the HHW and flat plate solar thermal pre-heat systems are insufficient to raise the DHW temperature to above 150 deg F. (1).
   c. AND 60 seconds after status of evaporator (100-135F HHW) water and condenser (145-160F) water pumps are proven by a flow switch installed downstream of each pump and the 100% open limit switch at the heat pump isolation valves is received.

3. The heat pump shall be disabled whenever:
   a. On failure of condenser water or evaporator flow.
   b. OR the DHW storage temperature is satisfied.
   c. OR the main chiller plant is scheduled to be OFF.

4. To prevent short cycling, the heat pump shall run for a minimum of 15 minutes and be off a minimum of 15 minutes unless shutdown on safeties or outside air conditions. The heat pump shall run subject to its own internal safeties and controls.

B. High Temperature Heating Hot Water (160 F) Pump Operation:

1. The pump shall run anytime the heat pump is called to run.

2. The pump shall have:
   a. A 10 second delay on start.
   b. A 45 second delay on stop.
   c. Pump VFD shall not operate below 20% of maximum frequency.
   d. Provide alarms as follows:
      (1) Failure: Commanded on, but the status is off.
      (2) Running in hand: Commanded off, but the status is on.
      (3) Runtime exceeded: Status runtime exceeds a user definable limit.

C. Heat Pump System Status Display: The heat pump plant control software shall provide operating status for the system. The display shall include:

1. Heat Pump enable/disable status.
2. System supply water setpoint.
3. System supply and return water temperatures.
4. System heating hot water pump status.
5. System heating hot water flow.
6. System failure information.

D. Event Processing—All heat pump control and status events shall be recorded, at the operator's selection, in the BMS event log to facilitate troubleshooting.

3.4 Flat Plate Solar Thermal System

A. The drain-back flat plate solar thermal system pump(s) shall be activated when the solar panel temperature exceeds the drain-back storage tank water temperature.

B. When the solar thermal system water temperature exceeds the 100-130 F HHW system temperature it is used to raise the temperature of the HHW system up to 135 F.

C. When the solar thermal system water temperature exceeds the HHW pre-heated DHW system temperature it is used to raise the temperature of the DHW system up to 160 F to avoid using the water-to-water or air-to-water heat pumps and also final electric resistance in the hybrid air-to-water heat pump.

D. When the solar thermal system water temperature exceeds the HHW pre-heated DI DHW system temperature it is used to raise the temperature of the DI DHW system up to 200 F to avoid using the electric resistance in the OR humidifiers and sterilizer systems.

E. The drain-back flat plate solar thermal system pump(s) shall be de-activated when the solar panel temperature is lower than the drain-back storage tank water temperature, or if there are no solar thermal loads to be served.

3.5 100% Outside Air Heat Recovery Indirect Evaporative Cooling Vav Air Handling Units—Ahu-1A to Ahu-5B A. Modes summary:

1. Occupied: System shall provide ventilation and conditioned supply air to all of the building zones during occupied schedule.

2. Setback: System shall circulate air as required to maintain a zone temperature setback.

3. Warmup: System shall circulate air and support heating to transition from unoccupied to occupied operation.

4. Cooldown: System shall circulate air and support cooling to transition from unoccupied to occupied operation.

5. Unoccupied: System shall provide ventilation and conditioned air supply to Critical Areas of the building zones during an unoccupied schedule.

6. After Hours: System shall provide ventilation and conditioned air supply to a reduced subset of the building zones during an after-hours schedule.

7. Emergency/Standby: System shall not operate.

8. Fire Mode: System shall not operate, except as controlled manually via the fire/smoke controls.

B. Unit Control Overview

1. The unit will operate to maintain the Supply Air Temperature at the Supply Air Temperature Set Point plus the largest Differential Set Point of any active heating or cooling component (Run-around coil, evaporative media, and CHW/HHW coil). Supply Air Dew Point will be limited to the Supply Air Temperature Set Point plus the Supply Air Dew Point Differential. Return Air Relative Humidity will be limited to below the maximum and above the minimum set points.

2. The unit will operate in the "Occupied" Mode if the Warm-Up Mode binary value is set to "Off" and will operate in the "Warm-Up" Mode if the Warm-Up Mode binary value is set to "On".

C. Unit Start/Stop Sequence

1. The DDC Start Sequence will be initiated whenever the HAND-OFF-AUTO (HOA) Switch is placed in the "HAND" position or when the DDC Remote Enable Contact (by others) is closed while the HOA Switch is in the "AUTO" position. The Unit Enable binary value must also be set to "On" by the BMS or LCD Display. The fan control sequence will then be executed.

2. To allow automatic dry-out of the evaporative media and shut-down the unit, it is only necessary to move the HOA switch from the "AUTO" to the "OFF" position or set the Unit Enable binary value to "Off".

3. Note that the "HAND" position will operate the unit in the Occupied Mode regardless of the Warmup Mode binary value and is intended to be a "Service Man's" function. In addition, if the HOA Switch is moved from "HAND" to "OFF", the automatic dry-out cycle will be terminated immediately and the unit will shut down.

D. Fan Operation

1. Supply fan array shall be started automatically from the BMS.

2. The exhaust fan array shall be started automatically from the BMS through a software interlock with the supply fan array.

3. Supply and exhaust fans shall run for a minimum of 5 minutes and be off a minimum of 5 minutes unless shutdown on safeties.

4. Supply fans and return fans shall be stopped and alarm condition reported to the BMS on detection of smoke or abnormal suction or discharge pressure, as measured at the suction and discharge of units and reported to the BMS.

5. When the Supply and Exhaust Fans are ON, VFD speed shall gradually be increased from minimum to maximum over a two minute period or until duct static pressure setpoints are reached. The VFD will ramp down if the Supply Fans are OFF or the Duct Static Pressure Sensor fails.

6. Slowly ramp up to setpoint (1) and modulate to maintain the proper Duct Static Pressure setpoint.

E. Supply Tunnel Cooling Coil Valve

1. The cooling coil valve shall be enabled whenever:
a. The air temperature from the run-around coil is greater than 52 deg F. (1).
b. AND the fan status is on.
c. AND heating is not active.

2. When an adequate number of air handling units are simultaneously enabled, such that the resultant chilled water flow would cause a sudden surge in chilled water flow, the cooling valves shall be sequentially enabled to prevent such surge.

3. The cooling coil valve shall modulate to maintain the Discharge Air Temperature Setpoint of 52 deg F. (1).

4. The cooling coil valve shall open to 50% (1) whenever the freezestat is on.

5. The cooling valve shall be closed if
a. The Supply Fan Array is OFF
b. OR the AHU is in the Heating mode
c. OR the Discharge Air Sensor has failed.

F. Supply Tunnel Heating Coil Valve

1. The heating coil valve shall be enabled whenever:
a. The air temperature from the run-around coil is less than 52 deg F. (1).
b. AND the fan status is on.
c. AND the cooling coil is not active.

2. The heating coil valve shall modulate to maintain the Heating Discharge Setpoint of 52 deg F. (1).

3. The Heating Valve shall be closed if
a. The Cooling Valve is open, except if the freezestat is on, OR
b. The Supply Fan is off or the Discharge Air Sensor has failed.

4. The heating coil valve shall open to 100% (1) whenever the air temperature from the run-around coil is less than 40 deg F. or freezestat is on.

5. Whenever the freezestat is on the heating coil valve shall open to 100% (1), hot water pump(s) shall start and HHW plant shall be enabled.

G. Run-Around Coil Pump Control

1. The run-around coil pump for each AHU shall run when the outside air temperature after the supply fan array is lower than 50F (1) or higher than the return/exhaust air temperature+2 deg F. (1).

H. Evaporative Media Control

1. The evaporative media water flow shall be off whenever the outside air temperature is below 60 deg F.(1).

2. The IEC Sump will be enabled and filled when the O/A Temperature is greater than the Supply Air Temperature Set Point plus the O/A Temperature Differential to Enable IEC Sump set point and the unit is not currently in the scheduled dump mode. The IEC Sump will be disabled but remain filled when the O/A Temperature drops below the calculated IEC change over set point. The IEC Sump will be disabled and dumped immediately if the Outdoor air Temperature drops below the Minimum Temperature for Sump and DX Coil Operation set point.

3. The IEC pump will cycle on when the IEC Sump is enabled and full. The pump will not run during the dump and flush cycle however the unit will continue to run the Fan and Damper control.

4. Whenever the IEC Sump is filled, it will remain filled until the unit is shut down or the nightly scheduled dump occurs. The Dump Schedule Time will initiate a sump dump for 55 minutes followed by a sump flush for 5 minutes. The Fans will be forced to run for the IEC Sump Dry Out Time after the pump has been disabled.

I. Exhaust Tunnel CHW/HHW Coil Control

1. When the central heat recovery chiller plant is cooling load dominant, the heating hot water control valve will modulate open to reject heat to the exhaust air stream.

2. When the central heat recovery chiller plant is heating load dominant, the chilled water control valve will modulate open to extract heat from the exhaust air stream.

3. In order to minimize exhaust fan energy consumption the exhaust tunnel CHW/HHW coil shall be activated for each AHU in the following sequence:
   a. AHU 5A
   b. AHU 5B
   c. AHU 4A
   d. AHU 4B
   e. AHU 3A
   f. AHU 3B
   g. AHU 2A
   h. AHU 2B
   i. AHU 1A
   j. AHU 1B 4. As the differential between heating and cooling loads gets larger, more AHU exhaust coils will be brought into operation per the order above, and as the differential gets smaller the coils will be de-activated sequentially in the reverse order.

J. Exhaust Coil Bypass Control

1. The exhaust tunnel CHW/HHW coil bypass damper shall be opened whenever:
   a. The heating and cooling loads at the chiller plant are equal and balanced.
   b. AND the fan status is on.

2. The exhaust tunnel filter, evaporative media, and run-around coil bypass damper shall be opened whenever:
   a. The heating and cooling loads at the chiller plant are equal and balanced.
   b. AND the CHW/HHW coil bypass damper is open.
   c. AND the air temperature after the supply fan array is 52 deg F.+/−2 deg F. (1).
   d. AND the fan status is on.
   e. AND the run-around coil pump is off K. Occupied Mode 1. The supply fan array, exhaust fan array, and associated dedicated exhaust fans shall run continuously.

2. The supply air and intermediate AHU temperature sensors shall, through the BMS, activate the run-around coil pump, evaporative media and modulate the cooling/heating coil valve, in sequence, to maintain discharge air temperature setpoint.

3. Fan Volume Control:
   a. The supply fan volume shall be gradually increased from minimum to maximum over a two minute period or until duct static pressure setpoint is reached.
   b. Supply fan volume shall be varied by sensing duct system static pressure and increasing or decreasing fan volume to maintain pressure setpoint. Monitor the position of VAV box motorized dampers and gradually reduce the static pressure setpoint when there are no dampers that are open more than 90% or sensing airflow demand from all terminal boxes and increasing or decreasing fan volume to satisfy airflow requirements.
   c. Supply fan volume control shall be accomplished by modulating adjustable frequency drive output and staging fans in parallel.
   d. The exhaust fan array volume control shall initiate immediately after fan starting. Exhaust fan volume shall be varied by sensing duct system static pressure and increasing or decreasing fan volume to maintain pressure setpoint. Sensor shall be located at the first floor.
   e. Exhaust fan volume control shall be accomplished by modulating variable frequency drive output and staging fans in parallel.
   f. If multiple variable volume fans are operating in parallel the lead fan shall be operating at 95 percent of full volume when the second stage fan is started. Both fans shall then share the load equally. If additional fans are in the group follow similar sequence for other fans. Alternate the lead fan automatically at each system start up.

L. Unoccupied Mode—When the AHU is in the Unoccupied Mode, the Supply and Exhaust Fan Arrays will be OFF, the VFDs, Outdoor Air Damper, exhaust damper, Cooling Valve, and the Heating Valve will be closed. The heating valve shall be open fully if the post run-around coil air temperature falls below a freeze avoidance temperature setpoint of 40 deg F.

M. Night Setback Heating Mode—The system shall operate in setback mode when the AHU is in unoccupied mode and a space temperature sensor indicates temperature below the unoccupied heating setpoint (initially set at 55 F). When the AHU is in the Night Setback Heating Mode, the Supply and Exhaust Fans will operate continuously. The VFDs will modulate to maintain the Duct Static Pressure, the Cooling Valve will be closed, and the Heating Valve will modulate to maintain the maximum heating Discharge Air Temperature setpoint. The unit shall signal all VAV Terminal Units to operate at full flow and reheat until all space temperature sensors indicate temperature of 5 deg F. above the night setback setpoint temperature or the AHU's mode of operation changes to Morning Warm Up or Occupied, at which point the night setback mode shall be terminated.

N. Warm Up and Cool Down Mode—The system shall operate in Warm Up or Cool Down mode prior to start of scheduled occupancy period and as determined by the optimum start program in order to bring the space temperature within the desired range at start of occupancy. The length of the period shall be set automatically and adjusted in response to the outside and space temperature or by the Operator.

1. Warm Up mode: The run-around coil pump shall be activated and heating coil valve shall be modulated to maintain supply setpoint air temperature, and VFDs will modulate to maintain duct static pressure. The maximum supply air temperature setpoint from the reheat coils shall be 100 deg F. Morning warm-up shall be maintained at first start-up each morning, and continue until the return air temperature reaches 68 deg F. The system shall be programmed to prevent morning warm-up mode to be initiated more than once per day.

2. During the Cool Down mode the system shall operate as in the occupied mode until setpoints are reached.

O. Fire Mode—Supply and exhaust fans shall turn off in the event of a fire in the service area of the AHU. There shall be no change in the system's status if the unit is on an adjacent floor without fire alarm.

P. The low limit thermostat shall, via hardwired connections, stop the supply and return fans if the temperature anywhere along its element falls below 38 deg F.

Q. Building management System Interface—If the AHU's local controller communication with the BMS is lost, the AHU uses its default setpoints and operates in the Occupied Cooling mode.

R. At a minimum the BMS will monitor all of the I/O points shown on control drawings or as indicated in the Building Management System Points List.

3.6 Variable Air Volume Terminal Units with Hot Water Reheat

A. VAV terminals with reheat

1. Occupied space temperature setpoints shall be initially set at 74° F. Cooling (adj) and 70° F. Heating (adj). They can be adjusted at the Operator Workstation 2. On a rise in temperature above the cooling setpoint, the VAV terminal unit shall modulate to its maximum CFM. As the space temperature drops below the cooling setpoint, the terminal unit shall modulate to its minimum CFM to maintain required Table 4-A ACH. As the space temperature continues to fall to the heating setpoint, the terminal shall proportionally modulate open the reheat control valve.

3. The matching zone exhaust valve shall track the supply CFM to maintain scheduled room pressure differential positive, negative, or equal as scheduled.

4. The scheduled zones shall reduce to the unoccupied minimum when the time of day schedule indicates, or the associated occupancy sensors indicate no occupancy while maintaining the required pressure relationships.

3.7 or Fan Coil Units:

A. The OR fan-coils shall run whenever AHU-2A and AHU-2B run to maintain the OR at the temperature and humidity setpoints chosen by the surgeon.

B. The VFD of the supply fan shall maintain the scheduled occupied and unoccupied (6 ACH) CFM by means of a flow sensor on the fan inlet. The associated exhaust valve shall track the supply CFM to maintain the OR positive pressure.

C. Run Conditions—Scheduled: The unit shall run according to a user definable time schedule in the following modes:

1. Occupied Mode: The unit shall provide the design CFM (over 12 ACH) and maintain:
  a. 68-75 deg F. (adj.)
  b. 20-60% RH (adj.)

2. Unoccupied Mode (night setback): The unit shall reduce airflow to 6 ACH and maintain:
  a. A 80 deg F. (adj.) cooling setpoint.
  b. A 60 deg F. (adj.) heating setpoint.

D. Alarms shall be provided as follows:

1. High Zone Temp: If the zone temperature is greater than the cooling setpoint by a user definable amount (adj.).

2. Low Zone Temp: If the zone temperature is less than the heating setpoint by a user definable amount (adj.).

3. High Zone Humidity: If the zone humidity is greater than the setpoint by a user definable amount (adj.).

4. Low Zone Humidity: If the zone humidity is less than the setpoint by a user definable amount (adj.).

5. High static pressure above 1" on the HEPA final filter.

E. Zone Unoccupied Override:

1. A timed local override control shall allow an occupant to override the schedule and place the unit into an occupied mode for an adjustable period of time. At the expiration of this time, control of the unit shall automatically return to the schedule.

F. Fan: The fan shall run anytime the unit is commanded to run unless shutdown on safeties.

1. Cooling Coil Valve: The controller shall measure the zone temperature and modulate the cooling coil valve to maintain its cooling and humidity setpoints.

2. Cooling shall be enabled whenever:
  a. De-humidification is called for.
  b. OR the zone temperature is above cooling setpoint.
  c. AND the fan is on.

3. Heating Coil Valve: The controller shall measure the zone temperature and modulate the heating coil valve to maintain its heating setpoint.

4. The heating coil shall be enabled whenever:
  a. Reheat is called for after de-humidification.
  b. OR the zone temperature is below heating setpoint.
  c. AND the fan is on.

5. The electric humidifier shall be activated on call for higher humidity.

G. Alarms shall be provided as follows:

1. Fan Failure: Commanded on, but the status is off.

2. Fan in Hand: Commanded off, but the status is on.

3. Fan Runtime Exceeded: Fan status runtime exceeds a user definable limit.

3.8 Penthouse Fan Coil Units:

A. Run Conditions—Scheduled: The unit shall run according to a user definable time schedule in the following modes:

1. Occupied Mode: The unit shall maintain:
  a. A 74 deg F. (adj.) cooling setpoint
  b. A 70 deg F. (adj.) heating setpoint.

2. Unoccupied Mode (night setback): The unit shall maintain:
  a. A 85 deg F. (adj.) cooling setpoint.
  b. A 55 deg F. (adj.) heating setpoint.

B. Alarms shall be provided as follows:

1. High Zone Temp: If the zone temperature is greater than the cooling setpoint by a user definable amount (adj.).

2. Low Zone Temp: If the zone temperature is less than the heating setpoint by a user definable amount (adj.).

C. Zone Unoccupied Override:

1. A timed local override control shall allow an occupant to override the schedule and place the unit into an occupied mode for an adjustable period of time. At the expiration of this time, control of the unit shall automatically return to the schedule.

D. Fan: The fan shall run anytime the unit is commanded to run unless shutdown on safeties.

1. Cooling Coil Valve: The controller shall measure the zone temperature and modulate the cooling coil valve to maintain its cooling setpoint.

2. Cooling shall be enabled whenever:
  a. The chiller plant is heating load dominant.
  b. AND the fan is on.

3. Heating Coil Valve: The controller shall measure the zone temperature and modulate the heating coil valve to maintain its heating setpoint.

4. Heating shall be enabled whenever:

a. The chiller plant is cooling load dominant.

b. AND the zone temperature is below heating setpoint (65F, adjustable).

c. AND the fan is on.

E. Fan Status: The controller shall monitor the fan status.

F. Alarms shall be provided as follows:

1. Fan Failure: Commanded on, but the status is off.

2. Fan in Hand: Commanded off, but the status is on.

3. Fan Runtime Exceeded: Fan status runtime exceeds a user definable limit.

3.9 Exhaust Fans—Mechanical and Electrical Rooms

A. The exhaust fans will be enabled and the make-up louver dampers opened when the chiller plant is cooling dominated. The fans are sized for a 10F delta T which means these rooms will be kept under 100F at peak conditions.

B. The exhaust fan will start and stop by an adjustable line voltage thermostat. Thermostat to be set at 80 deg F.

C. Emergency Ventilation Mode for the Mechanical Room: when an excessive concentration of refrigerant is sensed in the MER the BAS shall turn the exhaust fan in the high speed purge mode. The purge mode shall:

1. Provide a ventilation exhaust rate not less than that specified ASHRAE 15-2019—Safety Code for Mechanical Refrigeration.

2. Provide sufficient make-up

FIG. 1 is a schematic view of a heat recovery system 100, in accordance with some embodiments. Accordingly, the heat recovery system 100 may include a chiller 102, a plurality of primary heat exchangers 104, 106, 108, a plurality of primary pumps 110, 112, 114, a plurality of secondary heat exchangers 116, 118, and a plurality of secondary pumps 120, 122.

Further, the chiller 102 may be configured for providing primary fluid associated with a primary temperature from a primary port of the chiller 102 and secondary fluid associated with a secondary temperature from a secondary port of the chiller 102. Further, the primary fluid may include at least one chilled water (CHW) and hot heating water (HHW).

Further, the plurality of primary heat exchangers 104, 106, 108 may be fluidly coupled with the primary port of the chiller 102. Further, the plurality of primary heat exchangers 104, 106, 108 may be configured for exchanging a first amount of heat between the primary fluid and a plurality of primary mediums creating at least one of a heat deficit and a heat excess in the plurality of primary mediums. Further, the plurality of primary mediums may include at least one first primary medium and at least one second primary medium. Further, the at least one first primary medium allows recovering of at least one of the heat deficit and the heat excess of the first amount of the heat from the at least one first primary medium. Further, the at least one second primary medium does not allow recovering of at least one of the heat deficit and the heat excess of the first amount of the heat from the at least one second primary medium.

Further, the plurality of primary pumps 110, 112, 114 may be fluidly coupled with the primary port of the chiller 102 and the plurality of primary heat exchangers 104, 106, 108. Further, the plurality of primary pumps 110, 112, 114 may be configured for circulating the primary fluid between the chiller 102 and the plurality of primary heat exchangers 104, 106, 108. Further, the exchanging of the first amount of the heat may be based on the circulating of the primary fluid.

Further, the plurality of secondary heat exchangers 116, 118 may be fluidly coupled with the secondary port of the chiller 102. Further, the plurality of secondary heat exchangers 116, 118 may be configured for exchanging a second amount of heat between the secondary fluid and a plurality of secondary mediums.

Further, the plurality of secondary pumps 120, 122 may be fluidly coupled with the secondary port of the chiller 102 and the plurality of secondary heat exchangers 116, 118. Further, the plurality of secondary pumps 120, 122 may be configured for circulating the secondary fluid between the chiller 102 and the plurality of secondary heat exchangers 116, 118. Further, the exchanging of the second amount of the heat may be based on the circulating of the secondary fluid.

Further, in some embodiments, the plurality of primary heat exchangers 104, 106, 108 may include a geothermal heat exchanger 104. Further, the at least one first primary medium may include a ground. Further, the geothermal heat exchanger 104 may be configured for exchanging the first amount of the heat between the primary fluid and the ground. Further, the ground allows for the recovering of at least one of the heat deficit and the heat excess of the first amount of the heat from the ground.

Further, in some embodiments, the plurality of primary heat exchangers 104, 106, 108 may include a wastewater heat exchanger 106. Further, the at least one first primary medium may include wastewater. Further, the wastewater heat exchanger 106 may be configured for exchanging the first amount of the heat between the primary fluid and the wastewater. Further, the wastewater allows for the recovering of at least one of the heat deficit and the heat excess of the first amount of the heat from the wastewater.

Further, in some embodiments, the plurality of primary heat exchangers 104, 106, 108 may include a coil heat exchanger 108. Further, the at least one second primary medium may include air. Further, the coil heat exchanger 108 may be configured for exchanging the first amount of the heat between the primary fluid and the air. Further, the air does not allow for the recovering of at least one of the heat deficit and the heat excess of the first amount of the heat from the air.

Further, in some embodiments, the plurality of secondary heat exchangers 116, 118 may include a solar heat exchanger 116. Further, the plurality of secondary mediums may include air. Further, the solar heat exchanger 116 may be configured for exchanging the first amount of the heat between the secondary fluid and the air.

In further embodiments, a supply air handling unit 124 may be thermally coupled with a secondary heat exchanger 118 of the plurality of secondary heat exchangers 116, 118. Further, the supply air handling unit 124 may be configured for supplying an output supply air associated with an output supply temperature from a supply outlet of the supply air handling unit 124 based on receiving an input supply air associated with an input supply temperature through a supply inlet of the supply air handling unit 124. Further, the secondary heat exchanger 118 may be configured for exchanging the second amount of the heat between the secondary fluid and the input supply air associated with the input supply temperature for creating the output supply air associated with the output supply temperature based on the receiving. Further, the supplying of the output supply air may be based on the creating of the output supply air. In further embodiments, at least one supply variable air volume system 126, 128, 130, 132 may be fluidly coupled with the supply outlet port of the supply air handling unit 124.

Further, the at least one supply variable air volume system 126, 128, 130, 132 may be configured for dispensing at least one amount of the output supply air in at least one space based on the supplying. Further, in an embodiment, at least one sensor may be disposed in the at least one space. Further, the at least one sensor may be configured for generating at least one environment data of the at least one space based on an environmental condition of the at least one space. Further, the environmental condition may include temperature, pressure, humidity, etc. Further, a controller may be communicatively coupled with the at least one sensor. Further, the controller may be configured for analyzing the at least one environment data. Further, the controller may be configured for determining a change in the environmental condition based on the analyzing. Further, the controller may be configured for generating at least one operational command based on the determining. Further, the controller may be communicatively coupled with the at least one supply variable air volume system 126, 128, 130, 132. Further, the dispensing of the at least one amount of the output supply air in the at least one space may be based on the at least one operational command. Further, in an embodiment, a communication device may be communicatively coupled with the controller. Further, the communication device may be configured for transmitting the at least one environment data to at least one device. Further, in an embodiment, at least one secondary heat exchanger of the plurality of secondary heat exchangers 116, 118 may be thermally coupled with the at least one supply variable air volume system 126, 128, 130, 132. Further, the at least one secondary heat exchanger may be configured for exchanging a third amount of heat between the secondary fluid and the at least one amount of the output supply air dispensed through the at least one supply variable air volume system 126, 128, 130, 132.

In further embodiments, an exhaust air handling unit 134 may be thermally coupled with a primary heat exchanger 108 of the plurality of primary heat exchangers 104, 106, 108. Further, the exhaust air handling unit 134 may be configured for expelling an output extract air associated with an output exhaust temperature from an exhaust outlet of the exhaust air handling unit 134 based on extracting an input exhaust air associated with an input exhaust temperature through an exhaust inlet of the exhaust air handling unit 134. Further, the primary heat exchanger 108 may be configured for exchanging the first amount of the heat between the primary fluid and the input exhaust air associated with the input exhaust temperature for creating the output exhaust air associated with the output exhaust temperature based on the extracting. Further, the expelling of the output exhaust air may be based on the creating of the output exhaust air. In further embodiments, at least one exhaust variable air volume system 136, 138, 140, 142 may be fluidly coupled with the exhaust inlet port of the exhaust air handling unit 134. Further, the at least one exhaust variable air volume system 136, 138, 140, 142 may be configured for receiving at least one amount of the input exhaust air from the at least one space based on the extracting. In further embodiments, a run around recovery coil system 144 may be thermally coupled with the supply air handling unit 124 and the exhaust air handling unit 134. Further, the run around recovery coil system 144 may include a first heat exchanger 146 and a second heat exchanger 148. Further, the first heat exchanger 146 may be disposed in the supply air handling unit 124 and the second heat exchanger 148 may be disposed in the exhaust air handling unit 134. Further, the first heat exchanger 146 may be configured for exchanging a fourth amount of heat between the input supply air and a recovery fluid of the run around recovery coil system 144 for modifying a temperature of the recovery fluid from a first temperature value to a second temperature value. Further, the second heat exchanger 148 may be configured for exchanging a fifth amount of heat between the input exhaust air and the recovery fluid for modifying the temperature from the second temperature value to the first temperature value. Further, in an embodiment, the run around recovery coil system 144 may include a recovery pump 150. Further, the recovery pump 150 may be fluidly coupled with the first heat exchanger 146 and the second heat exchanger 148. Further, the recovery pump 150 may be configured for circulating the recovery fluid between the first heat exchanger 146 and the second heat exchanger 148. Further, the exchanging of the fourth amount of the heat between the input supply air and the recovery fluid and the exchanging of the fifth amount of the heat between the input exhaust air and the recovery fluid may be based on the circulating of the recovery fluid.

Figure 2:
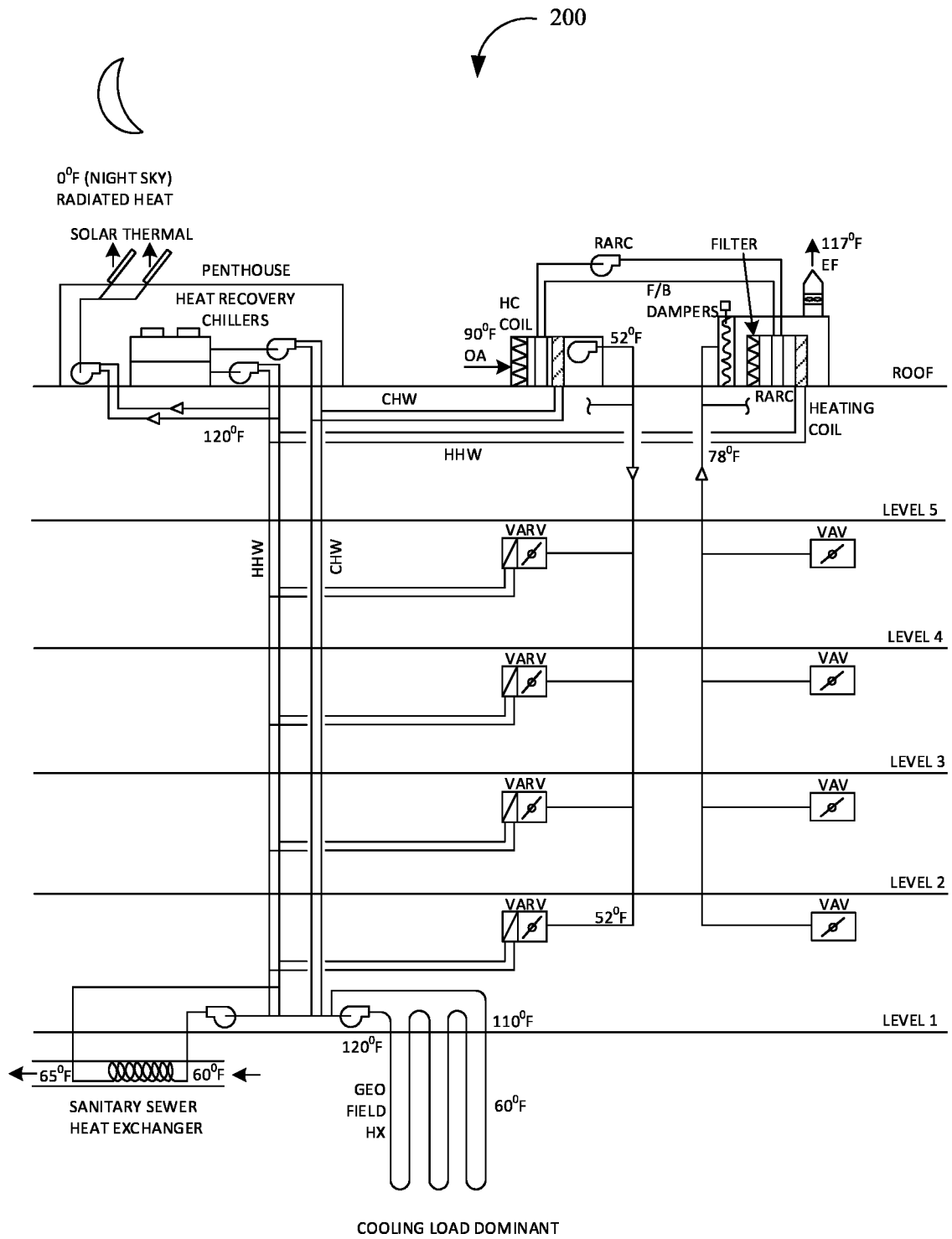
FIG. 2 is a schematic view of a heat recovery system in a cooling load dominant mode, in accordance with some embodiments.

FIG. 2 is a schematic view of a heat recovery system 200 in a cooling load dominant mode, in accordance with some embodiments.

Figure 3:
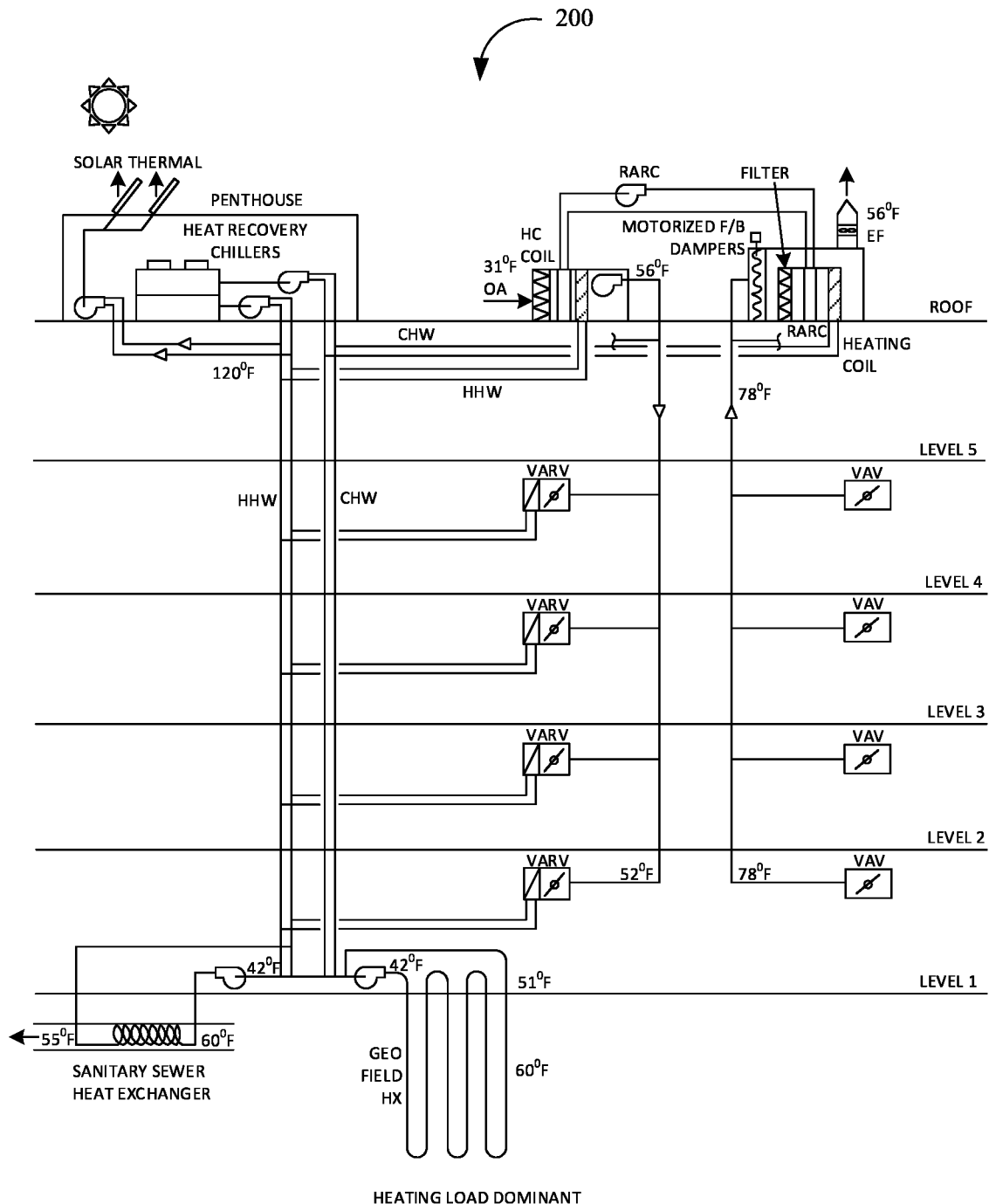
FIG. 3 is a schematic view of the heat recovery system in a heating load dominant mode, in accordance with some embodiments.

FIG. 3 is a schematic view of the heat recovery system 200 in a heating load dominant mode, in accordance with some embodiments.

Figure 4:
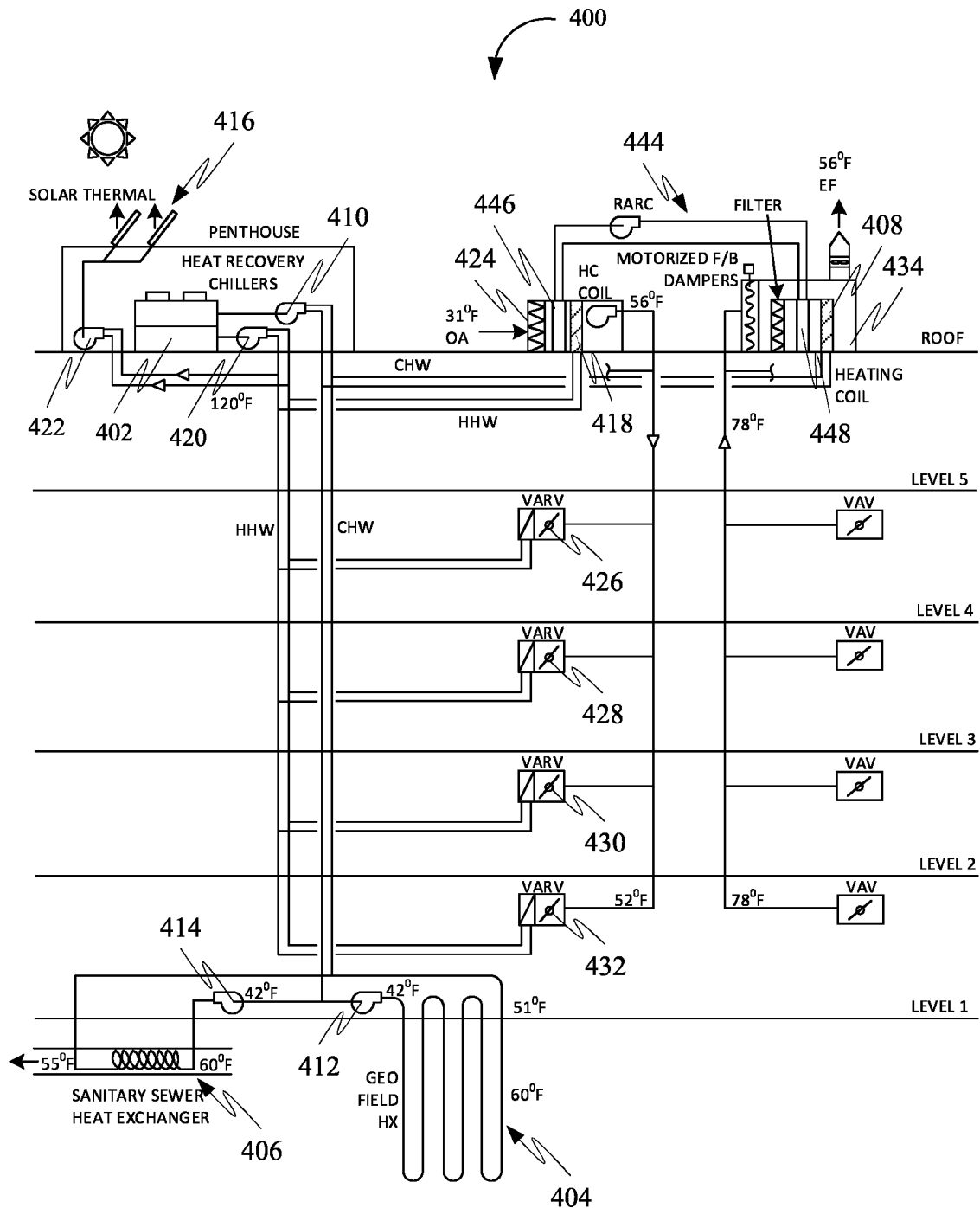
FIG. 4 is a schematic view of a heat recovery system, in accordance with some embodiments.

FIG. 4 is a schematic view of a heat recovery system 400, in accordance with some embodiments. Accordingly, the heat recovery system 400 may include a chiller 402, a plurality of primary heat exchangers 404-408, a plurality of primary pumps 410-414, a plurality of secondary heat exchangers 416-418, a plurality of secondary pumps 420-422, and a supply air handling unit 424.

Further, the chiller 402 may be configured for providing primary fluid associated with a primary temperature from a primary port of the chiller 402 and secondary fluid associated with a secondary temperature from a secondary port of the chiller 402.

Further, the plurality of primary heat exchangers 404-408 may be fluidly coupled with the primary port of the chiller 402. Further, the plurality of primary heat exchangers 404-408 may be configured for exchanging a first amount of heat between the primary fluid and a plurality of primary mediums creating at least one of a heat deficit and a heat excess in the plurality of primary mediums. Further, the plurality of primary mediums may include at least one first primary medium and at least one second primary medium. Further, the at least one first primary medium allows recovering of at least one of the heat deficit and the heat excess of the first amount of the heat from the at least one first primary medium. Further, the at least one second primary medium does not allow recovering of at least one of the heat deficit and the heat excess of the first amount of the heat from the at least one second primary medium.

Further, the plurality of primary pumps 410-414 may be fluidly coupled with the primary port of the chiller 402 and the plurality of primary heat exchangers 404-408. Further, the plurality of primary pumps 410-414 may be configured for circulating the primary fluid between the chiller 402 and the plurality of primary heat exchangers 404-408. Further, the exchanging of the first amount of the heat may be based on the circulating of the primary fluid.

Further, the plurality of secondary heat exchangers 416-418 may be fluidly coupled with the secondary port of the chiller 402. Further, the plurality of secondary heat exchangers 416-418 may be configured for exchanging a second amount of heat between the secondary fluid and a plurality of secondary mediums.

Further, the plurality of secondary pumps 420-422 may be fluidly coupled with the secondary port of the chiller 402 and the plurality of secondary heat exchangers 416-418. Further, the plurality of secondary pumps 420-422 may be configured for circulating the secondary fluid between the chiller 402 and the plurality of secondary heat exchangers 416-418. Further, the exchanging of the second amount of the heat may be based on the circulating of the secondary fluid.

Further, the supply air handling unit 424 may be thermally coupled with a secondary heat exchanger 418 of the plurality of secondary heat exchangers 416-418. Further, the supply air handling unit 424 may be configured for supplying an output supply air associated with an output supply temperature from a supply outlet of the supply air handling unit 424 based on receiving an input supply air associated with an input supply temperature through a supply inlet of the supply air handling unit 424. Further, the secondary heat exchanger 418 may be configured for exchanging the second amount of the heat between the secondary fluid and the input supply air associated with the input supply temperature for creating the output supply air associated with the output supply temperature based on the receiving. Further, the supplying of the output supply air may be based on the creating of the output supply air.

In further embodiments, at least one supply variable air volume system 426-432 may be fluidly coupled with the supply outlet port of the supply air handling unit 424. Further, the at least one supply variable air volume system 426-432 may be configured for dispensing at least one amount of the output supply air in at least one space based on the supplying.

In further embodiments, an exhaust air handling unit 434 may be thermally coupled with a primary heat exchanger 408 of the plurality of primary heat exchangers 404-408. Further, the exhaust air handling unit 434 may be configured for expelling an output extract air associated with an output exhaust temperature from an exhaust outlet of the exhaust air handling unit 434 based on extracting an input exhaust air associated with an input exhaust temperature through an exhaust inlet of the exhaust air handling unit 434. Further, the primary heat exchanger 408 may be configured for exchanging the first amount of the heat between the primary fluid and the input exhaust air associated with the input exhaust temperature for creating the output exhaust air associated with the output exhaust temperature based on the extracting. Further, the expelling of the output exhaust air may be based on the creating of the output exhaust air. In further embodiments, a run around recovery coil system 444 may be thermally coupled with the supply air handling unit 424 and the exhaust air handling unit 434. Further, the run around recovery coil system 444 may include a first heat exchanger 446 and a second heat exchanger 448. Further, the first heat exchanger 446 may be disposed in the supply air handling unit 424 and the second heat exchanger 448 may be disposed in the exhaust air handling unit 434. Further, the first heat exchanger 446 may be configured for exchanging a fourth amount of heat between the input supply air and a recovery fluid of the run around recovery coil system 444 for modifying a temperature of the recovery fluid from a first temperature value to a second temperature value. Further, the second heat exchanger 448 may be configured for exchanging a fifth amount of heat between the input exhaust air and the recovery fluid for modifying the temperature from the second temperature value to the first temperature value.

Further, in some embodiments, the plurality of primary heat exchangers 404-408 may include a geothermal heat exchanger 404. Further, the at least one first primary medium may include a ground. Further, the geothermal heat exchanger 404 may be configured for exchanging the first amount of the heat between the primary fluid and the ground. Further, the ground allows for the recovering of at least one of the heat deficit and the heat excess of the first amount of the heat from the ground.

Further, in some embodiments, the plurality of primary heat exchangers 404-408 may include a wastewater heat exchanger 406. Further, the at least one first primary medium may include wastewater. Further, the wastewater heat exchanger 406 may be configured for exchanging the first amount of the heat between the primary fluid and the wastewater. Further, the wastewater allows for the recovering of at least one of the heat deficit and the heat excess of the first amount of the heat from the wastewater.

Further, in some embodiments, the plurality of primary heat exchangers 404-408 may include a coil heat exchanger 408. Further, the at least one second primary medium may include air. Further, the coil heat exchanger 408 may be configured for exchanging the first amount of the heat between the primary fluid and the air. Further, the air does not allow for the recovering of at least one of the heat deficit and the heat excess of the first amount of the heat from the air.

Further, in some embodiments, the plurality of secondary heat exchangers 416-418 may include a solar heat exchanger 416. Further, the plurality of secondary mediums may include air. Further, the solar heat exchanger 416 may be configured for exchanging the first amount of the heat between the secondary fluid and the air.

Figure 5:
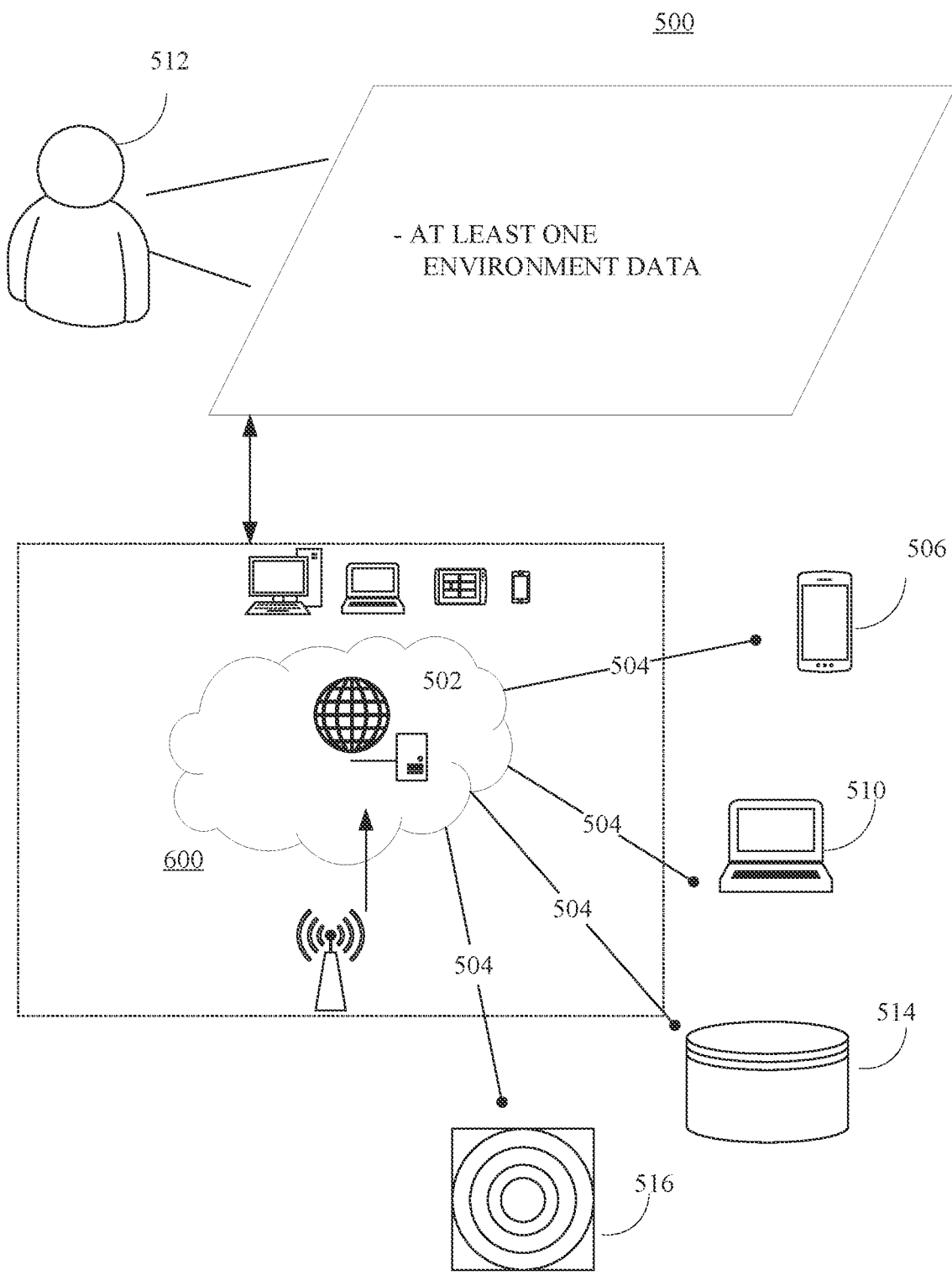
FIG. 5 is an illustration of an online platform consistent with various embodiments of the present disclosure.

FIG. 5 is an illustration of an online platform 500 consistent with various embodiments of the present disclosure. By way of non-limiting example, the online platform 500 to facilitate management of a heat recovery system may be hosted on a centralized server 502, such as, for example, a cloud computing service. The centralized server 502 may communicate with other network entities, such as, for example, a mobile device 506 (such as a smartphone, a laptop, a tablet computer, etc.), other electronic devices 510 (such as desktop computers, server computers, etc.), databases 514, and sensors 516 over a communication network 504, such as, but not limited to, the Internet. Further, users of the online platform 500 may include relevant parties such as, but not limited to, end-users, administrators, service providers, service consumers, and so on. Accordingly, in some instances, electronic devices operated by the one or more relevant parties may be in communication with the platform.

A user 512, such as the one or more relevant parties, may access online platform 500 through a web based software application or browser. The web based software application may be embodied as, for example, but not be limited to, a website, a web application, a desktop application, and a mobile application compatible with a computing device 600.

Figure 6:
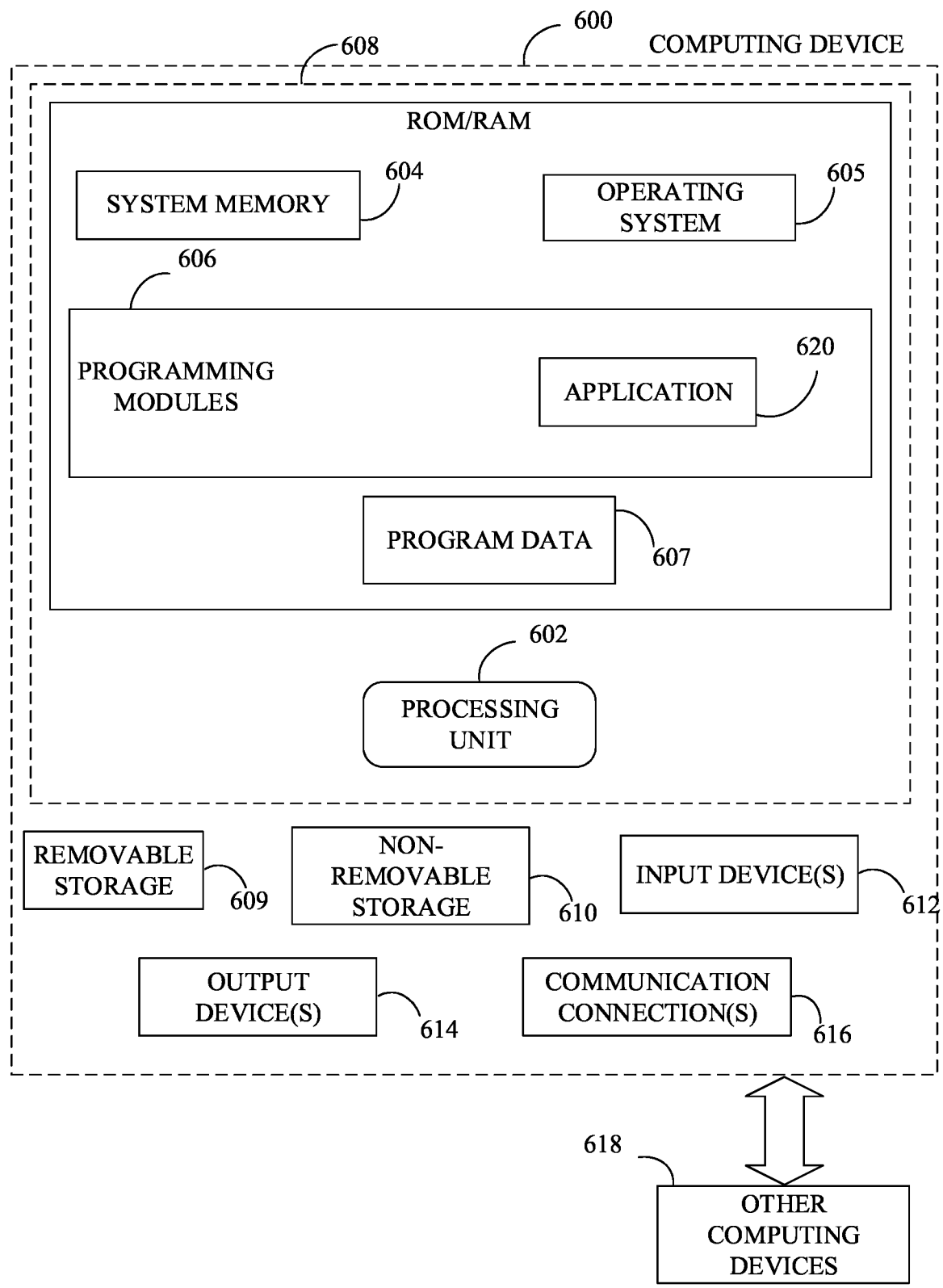
FIG. 6 is a block diagram of a computing device for implementing the methods disclosed herein, in accordance with some embodiments.

With reference to FIG. 6, a system consistent with an embodiment of the disclosure may include a computing device or cloud service, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include machine learning module. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and non-volatile, removable and non-removable media implemented in any method or technology for storage of information, such as computer-readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, a location sensor, a camera, a biometric sensor, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 may perform processes including, for example, one or more stages of methods, algorithms, systems, applications, servers, databases as described above. The aforementioned process is an example, and processing unit 602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A heat recovery system comprising:
a chiller configured for providing a primary fluid associated with a primary temperature from a primary port of the chiller and a secondary fluid associated with a secondary temperature from a secondary port of the chiller;
a plurality of primary heat exchangers fluidly coupled with the primary port of the chiller;
wherein the plurality of primary heat exchangers are configured for exchanging a first amount of heat between the primary fluid and a plurality of primary mediums, such that the exchanging of the plurality of primary heat exchangers create at least one of a heat deficit and a heat excess in the plurality of primary mediums;
wherein the plurality of primary mediums comprises at least one first primary medium and at least one second primary medium;
a plurality of primary pumps fluidly coupled with the primary port of the chiller and the plurality of primary heat exchangers, wherein the plurality of primary pumps are configured for circulating the primary fluid between the chiller and the plurality of primary heat exchangers, wherein the exchanging of the first amount of the heat is based on the circulating of the primary fluid;
a plurality of secondary heat exchangers fluidly coupled with the secondary port of the chiller, wherein the plurality of secondary heat exchangers are configured for exchanging a second amount of heat between the secondary fluid and a plurality of secondary mediums; and
a plurality of secondary pumps fluidly coupled with the secondary port of the chiller and the plurality of secondary heat exchangers, wherein the plurality of secondary pumps are configured for circulating the secondary fluid between the chiller and the plurality of secondary heat exchangers, wherein the exchanging of the second amount of the heat is based on the circulating of the secondary fluid;
wherein the plurality of secondary heat exchangers comprises a solar heat exchanger, wherein the plurality of secondary mediums comprises air,
wherein the solar heat exchanger is configured for exchanging the first amount of the heat between the secondary fluid and the air.

2. The heat recovery system 1, wherein the plurality of primary heat exchangers comprises a geothermal heat exchanger, wherein the at least one first primary medium comprises a ground, wherein the geothermal heat exchanger is configured for exchanging the first amount of the heat between the primary fluid and the ground, wherein the ground allows for the recovering of at least one of the heat deficit and the heat excess of the first amount of the heat from the ground.

3. The heat recovery system 1, wherein the plurality of primary heat exchangers comprises a wastewater heat exchanger, wherein the at least one first primary medium comprises wastewater, wherein the wastewater heat exchanger is configured for exchanging the first amount of the heat between the primary fluid and the wastewater, wherein the wastewater allows for the recovering of at least one of the heat deficit and the heat excess of the first amount of the heat from the wastewater.

4. The heat recovery system 1, wherein the plurality of primary heat exchangers comprises a coil heat exchanger, wherein the at least one second primary medium comprises air, wherein the coil heat exchanger is configured for exchanging the first amount of the heat between the primary fluid and the air, wherein the air does not allow for the recovering of at least one of the heat deficit and the heat excess of the first amount of the heat from the air.

5. The heat recovery system of claim 1 further comprising:
a supply air handling unit thermally coupled with a secondary heat exchanger of the plurality of secondary heat exchangers;
wherein the supply air handling unit is configured for supplying an output supply air associated with an output supply temperature from a supply outlet of the supply air handling unit based on receiving an input supply air associated with an input supply temperature through a supply inlet of the supply air handling unit;
wherein the secondary heat exchanger is configured for exchanging the second amount of the heat between the secondary fluid and the input supply air associated with the input supply temperature for creating the output supply air associated with the output supply temperature based on the receiving; and
wherein the supplying of the output supply air is further based on the creating of the output supply air.

6. The heat recovery system of claim 5 further comprising at least one supply variable air volume system fluidly coupled with the supply outlet port of the supply air handling unit, wherein the at least one supply variable air volume system is configured for dispensing at least one amount of the output supply air in at least one space based on the supplying.

7. The heat recovery system of claim 6, wherein at least one secondary heat exchanger of the plurality of secondary heat exchangers is thermally coupled with the at least one supply variable air volume system, wherein the at least one secondary heat exchanger is configured for exchanging a third amount of heat between the secondary fluid and the at least one amount of the output supply air dispensed through the at least one supply variable air volume system.

8. The heat recovery system of claim 5 further comprising:
an exhaust air handling unit thermally coupled with a primary heat exchanger of the plurality of primary heat exchangers;
wherein the exhaust air handling unit is configured for expelling an output extract air associated with an output exhaust temperature from an exhaust outlet of the exhaust air handling unit based on extracting an input exhaust air associated with an input exhaust temperature through an exhaust inlet of the exhaust air handling unit;
wherein the primary heat exchanger is configured for exchanging the first amount of the heat between the primary fluid and the input exhaust air associated with the input exhaust temperature for creating the output exhaust air associated with the output exhaust temperature based on the extracting; and
wherein the expelling of the output exhaust air is further based on the creating of the output exhaust air.

9. The heat recovery system of claim 8 further comprising at least one exhaust variable air volume system fluidly coupled with the exhaust inlet port of the exhaust air handling unit, wherein the at least one exhaust variable air volume system is configured for receiving at least one amount of the input exhaust air from the at least one space based on the extracting.

10. The heat recovery system of claim 8 further comprising:
a run around recovery coil system thermally coupled with the supply air handling unit and the exhaust air handling units;
wherein the run around recovery coil system comprises a first heat exchanger and a second heat exchanger;
wherein the first heat exchanger is disposed in the supply air handling unit and the second heat exchanger is disposed in the exhaust air handling unit;
wherein the first heat exchanger is configured for exchanging a fourth amount of heat between the input supply air and a recovery fluid of the run around recovery coil system for modifying a temperature of the recovery fluid from a first temperature value to a second temperature value; and
wherein the second heat exchanger is configured for exchanging a fifth amount of heat between the input exhaust air and the recovery fluid for modifying the temperature from the second temperature value to the first temperature value.

11. The heat recovery system of claim 10, wherein:
the run around recovery coil system further comprises a recovery pump, wherein the recovery pump is fluidly coupled with the first heat exchanger and the second heat exchanger;
wherein the recovery pump is configured for circulating the recovery fluid between the first heat exchanger and the second heat exchanger; and
wherein the exchanging of the fourth amount of the heat between the input supply air and the recovery fluid and the exchanging of the fifth amount of the heat between the input exhaust air and the recovery fluid is further based on the circulating of the recovery fluid.

12. A heat recovery system comprising:
a chiller configured for providing a primary fluid associated with a primary temperature from a primary port of the chiller and a secondary fluid associated with a secondary temperature from a secondary port of the chiller;
a plurality of primary heat exchangers fluidly coupled with the primary port of the chiller,
wherein the plurality of primary heat exchangers are configured for exchanging a first amount of heat between the primary fluid and a plurality of primary mediums, such that the exchanging of the plurality of primary heat exchangers create at least one of a heat deficit and a heat excess in the plurality of primary mediums;
wherein the plurality of primary mediums comprises at least one first primary medium and at least one second primary medium;
a plurality of primary pumps fluidly coupled with the primary port of the chiller and the plurality of primary heat exchangers, wherein the plurality of primary pumps are configured for circulating the primary fluid between the chiller and the plurality of primary heat exchangers, wherein the exchanging of the first amount of the heat is based on the circulating of the primary fluid;
a plurality of secondary heat exchangers fluidly coupled with the secondary port of the chiller, wherein the plurality of secondary heat exchangers are configured for exchanging a second amount of heat between the secondary fluid and a plurality of secondary mediums;
a plurality of secondary pumps fluidly coupled with the secondary port of the chiller and the plurality of secondary heat exchangers, wherein the plurality of secondary pumps are configured for circulating the secondary fluid between the chiller and the plurality of secondary heat exchangers, wherein the exchanging of the second amount of the heat is based on the circulating of the secondary fluid; and
a supply air handling unit thermally coupled with a secondary heat exchanger of the plurality of secondary heat exchangers, wherein the supply air handling unit is configured for supplying an output supply air associated with an output supply temperature from a supply outlet of the supply air handling unit based on receiving an input supply air associated with an input supply temperature through a supply inlet of the supply air handling unit, wherein the secondary heat exchanger is configured for exchanging the second amount of the heat between the secondary fluid and the input supply air associated with the input supply temperature for creating the output supply air associated with the output supply temperature based on the receiving, wherein the supplying of the output supply air is further based on the creating of the output supply air;
wherein the plurality of secondary heat exchangers comprises a solar heat exchanger;
wherein the plurality of secondary mediums comprises air; and
wherein the solar heat exchanger is configured for exchanging the first amount of the heat between the secondary fluid and the air.

13. The heat recovery system of claim 12 further comprising at least one supply variable air volume system fluidly coupled with the supply outlet port of the supply air handling unit, wherein the at least one supply variable air volume system is configured for dispensing at least one amount of the output supply air in at least one space based on the supplying.

14. The heat recovery system of claim 12 further comprising:
- an exhaust air handling unit thermally coupled with a primary heat exchanger of the plurality of primary heat exchangers;
- wherein the exhaust air handling unit is configured for expelling an output extract air associated with an output exhaust temperature from an exhaust outlet of the exhaust air handling unit based on extracting an input exhaust air associated with an input exhaust temperature through an exhaust inlet of the exhaust air handling unit;
- wherein the primary heat exchanger is configured for exchanging the first amount of the heat between the primary fluid and the input exhaust air associated with the input exhaust temperature for creating the output exhaust air associated with the output exhaust temperature based on the extracting; and
- wherein the expelling of the output exhaust air is further based on the creating of the output exhaust air.

15. The heat recovery system of claim 14 further comprising:
- a run around recovery coil system thermally coupled with the supply air handling unit and the exhaust air handling unit;
- wherein the run around recovery coil system comprises a first heat exchanger and a second heat exchanger;
- wherein the first heat exchanger is disposed in the supply air handling unit and the second heat exchanger is disposed in the exhaust air handling unit,
- wherein the first heat exchanger is configured for exchanging a fourth amount of heat between the input supply air and a recovery fluid of the run around recovery coil system for modifying a temperature of the recovery fluid from a first temperature value to a second temperature value; and
- wherein the second heat exchanger is configured for exchanging a fifth amount of heat between the input exhaust air and the recovery fluid for modifying the temperature from the second temperature value to the first temperature value.

16. The heat recovery system 12, wherein:
- the plurality of primary heat exchangers comprises a geothermal heat exchanger;
- wherein the at least one first primary medium comprises a ground,
- wherein the geothermal heat exchanger is configured for exchanging the first amount of the heat between the primary fluid and the ground;
- wherein the ground allows for the recovering of at least one of the heat deficit and the heat excess of the first amount of the heat from the ground.

17. The heat recovery system 12, wherein:
- the plurality of primary heat exchangers comprises a wastewater heat exchanger;
- wherein the at least one first primary medium comprises wastewater;
- wherein the wastewater heat exchanger is configured for exchanging the first amount of the heat between the primary fluid and the wastewater; and
- wherein the wastewater allows for the recovering of at least one of the heat deficit and the heat excess of the first amount of the heat from the wastewater.

18. The heat recovery system 12, wherein:
- the plurality of primary heat exchangers comprises a coil heat exchanger;
- wherein the at least one second primary medium comprises air;
- wherein the coil heat exchanger is configured for exchanging the first amount of the heat between the primary fluid and the air; and
- wherein the air does not allow for the recovering of at least one of the heat deficit and the heat excess of the first amount of the heat from the air.

* * * * *